No. 876,916.
PATENTED JAN. 14, 1908.
J. A. SECREST.
POULTRY NEST.
APPLICATION FILED MAR. 20, 1907.
2 SHEETS—SHEET 1.
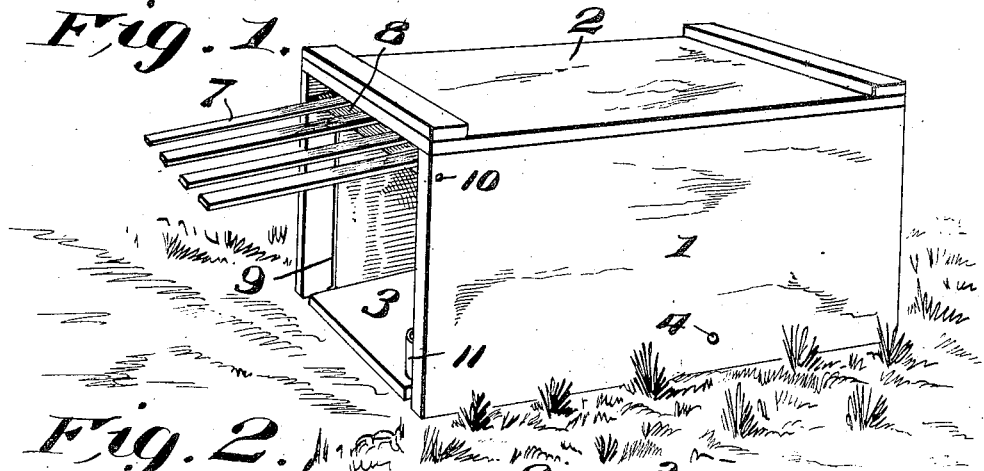
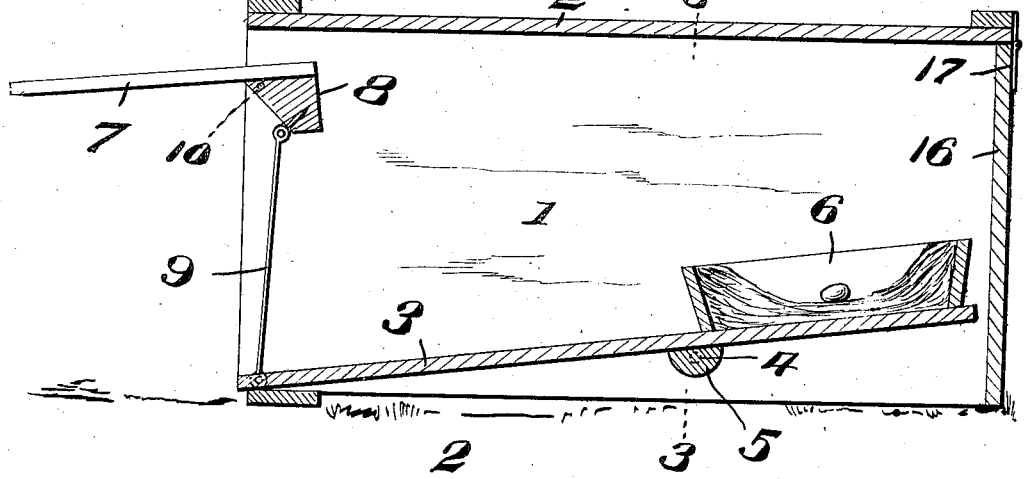
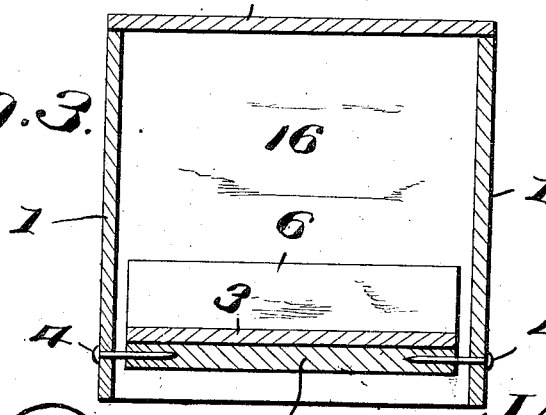
WITNESSES:
INVENTOR
J. A. Secrest
By W. J. Fitzgerald & Co.
Attorneys No. 876,916. PATENTED JAN. 14, 1908.
J. A. SECREST
POULTRY NEST.
APPLICATION FILED MAR. 20, 1907.

2 SHEETS—SHEET 2.

WITNESSES:
Thos. W. Riley
L. W. Anderson

INVENTOR
J. A. Secrest
BY
W. J. Fitzgerald & Co
Attorneys

UNITED STATES PATENT OFFICE.

JOHN A. SECREST, OF LANGDON, KANSAS, ASSIGNOR OF ONE-FIFTH TO JOHN L. DUNCAN, ONE-FIFTH TO CHARLES K. MAUCK, ONE-FIFTH TO BARTER E. COLE, AND ONE-FIFTH TO HANCE B. FERGUSON, OF LANGDON, KANSAS.

POULTRY-NEST.

No. 876,916.

Specification of Letters Patent.

Patented Jan. 14, 1908.

Application filed March 20, 1907. Serial No. 363,496.

*To all whom it may concern:*

Be it known that I, JOHN A. SECREST, a citizen of the United States, residing at Langdon, in the county of Reno and State of Kansas, have invented certain new and useful Improvements in Poultry-Nests; and I do hereby declare the following to be a full, clear, and exact description of the invention, such as will enable others skilled in the art to which it appertains to make and use the same.

My invention relates to new and useful improvements in poultry nests and my object is to provide means for automatically closing the entrance to the nest when the same is occupied by a fowl so that other poultry cannot gain access to the nest when the same is occupied.

A further object is to provide means for gaining ready access to the nest.

Other objects and advantages will be hereinafter referred to and more particularly pointed out in the claims.

Figure 4:
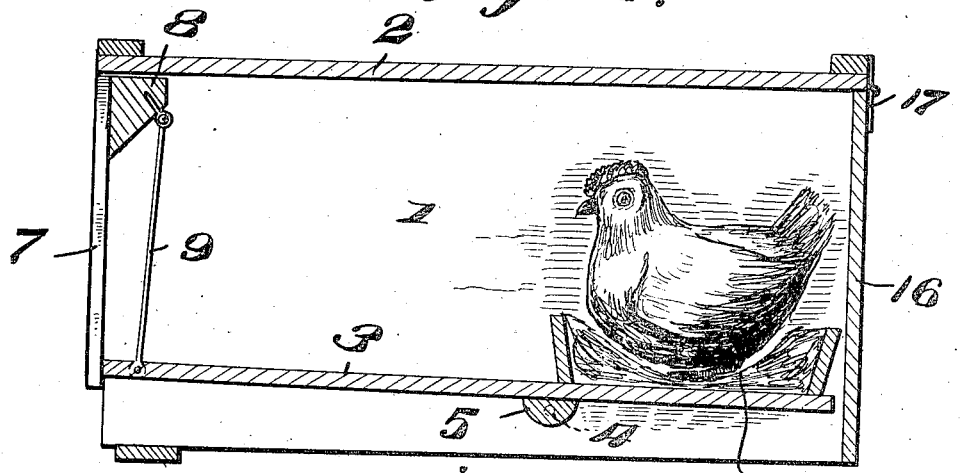
Figure 5:
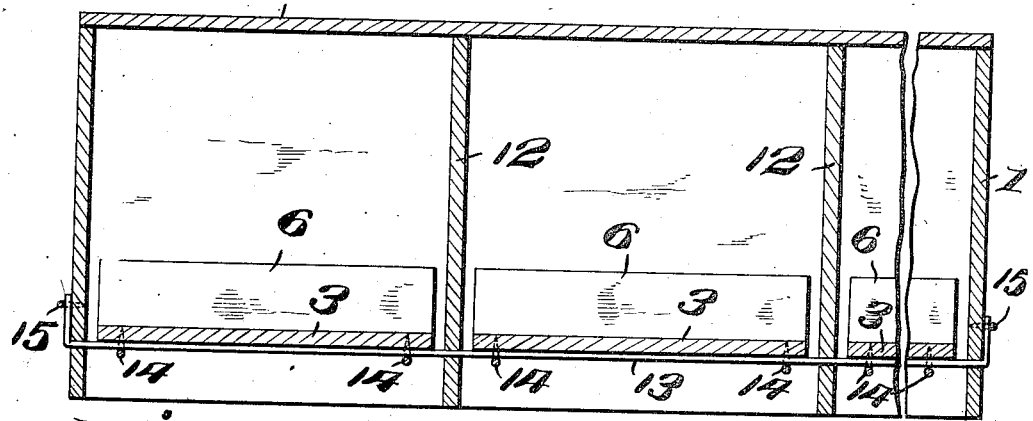
Figures 6, 7:
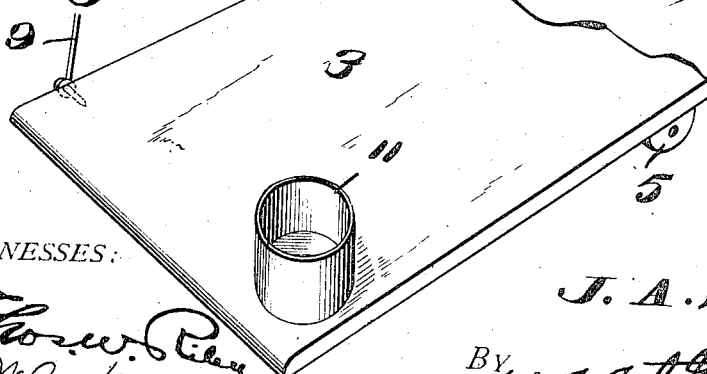

In the accompanying drawings which are a part of this specification, Figure 1 is a perspective view of my improved poultry nest complete showing the same open. Fig. 2 is a longitudinal vertical sectional view thereof. Fig. 3 is a transverse sectional view as seen on line 3—3 Fig. 2. Fig. 4 is a longitudinal central sectional view showing the nest occupied by a fowl and showing the parts of the nest in their closed position. Fig. 5 is a transverse sectional view showing the manner of providing a plurality of nests under one cover. Fig. 6 is a detail perspective view of the bottom of the nest removed and, Fig. 7 is a detail perspective view showing a slightly different manner of securing the floor to the closure for the nest.

Referring to the drawings in which similar reference numerals designate corresponding parts throughout the several views, 1 indicates the side walls of my improved nest and 2 the covering therefor, said side walls and covering forming a receptacle which is preferably oblong in general outline and is provided with a floor section 3 which is pivotally mounted between the side walls 1 and slightly above the lower edges thereof, the pivot points 4 for said floor being directed through the side walls 1 and a semicircular block 5 on the lower face of the floor, said pivot points being located adjacent the longitudinal center of the floor and towards the rear end thereof. Mounted upon the rear end of the floor 3 is a nest proper 6, said nest being so located that when occupied by the fowl the forward end of the floor will be elevated and in order to automatically close the entrance to the receptacle I provide a gate which is preferably constructed of slats or bars of wood 7, said slats being secured at their upper ends to a bar 8, which is pivotally mounted between the side walls 1 adjacent the upper edges thereof by means of pivot points 10, said pivot points being directed through the side walls 1 and partly into the bar 8, and in order to operate the gate with the tilting of the floor 3, I provide a pitman 9, the lower end of which is pivotally secured to the forward end of the floor while the opposite end thereof is secured to the bar 8 and it will be seen that when the forward end of the floor is elevated, the gate will be lowered and the entrance to the receptacle closed.

The bar 8 is so arranged that it serves as a balance weight and by providing the pivot points 10 thereof adjacent one edge of the bar, the weight of said bar will be at one side of the pivot point so that as soon as the fowl leaves the nest 6, the weight of the bar will elevate the gate and lower the outer end of the floor 3 thereby allowing the fowl to leave the receptacle.

In Fig. 7 of the drawing I have shown the pitman as secured to the upper surface of the floor 3 while in the remainder of the figures I have shown the pitman as secured to one edge of the floor and it will be understood that either form may be used as will best suit the occasion and in Fig. 6 of the drawings I have shown a cup 11 mounted upon the floor which is adapted to contain stone, sand, earth or other like substance to serve as an additional weight to balance the nest, the weight of the substance in the cup being made heavier or lighter according to the weight of the eggs in the nest.

I preferably place each nest in a separate receptacle so that said receptacles may be moved from place to place as desired but it will be readily understood that a series of the nests may be placed side by side and separated by partitions 12 as best shown in Fig. 5 thereby disposing a plurality of nests under one cover and when the nests are so arranged I dispense with the pivot pins 4 and direct laterally through the side walls 1 and partitions 12, a rod 13 upon which the plurality of floor sections 3 find bearings and said floor sections are secured to the rod by directing staples 14 around the rod and into the floor section, the protruding ends of the rod being bent upwardly parallel with the end walls and secured thereto by staples 15, thereby obviating any possibility of the rod becoming misplaced.

As the nest 6 is placed at the rear end of the receptacle and not readily accessible from the open end thereof I hingedly secure the cover 2 to the rear end 16 of the receptacle by means of hinges 17 so that by swinging said cover upwardly ready access may be had to the nest.

It will now be seen that I have provided a very cheap and economical form of nest for poultry and one that may be automatically operated by the fowl to close the entrance to the same so that when the nest is occupied other fowls cannot enter the receptacle. It will further be seen that I have provided means for gaining access to the nest even when occupied by the fowl and it will further be seen that a plurality of nests may be provided and placed under one cover so that a number of nests will occupy but a very small space.

What I claim is:

In a device of the class described, the combination with a receptacle; of a floor pivotally mounted in said receptacle and extending the full length thereof, the pivot point of said floor being nearer the rear end thereof, a nest mounted on the inner end of said floor, a cup at the forward end of said floor and to one side thereof adapted to receive weights to form a balance for said nest, a swinging cover for said receptacle, a gate at the open end of said receptacle, comprising a bar pivotally secured within said receptacle and a plurality of slats secured at their upper ends to said bar, the pivot point of said bar being located adjacent one edge of the bar, whereby the weight of said bar will be at one side of the pivot point thereof, a pitman pivotally secured between the forward end of the floor and the edge of the bar opposite the pivot point thereof, whereby when the nest is occupied, the floor will be swung upon its pivot point and the gate closed.

In testimony whereof I have signed my name to this specification in the presence of two subscribing witnesses.

JOHN A. SECREST.

Witnesses:
C. K. MAUCK,
J. L. DUNCAN.